United States Patent
Coussell et al.

[15] 3,689,843

[45] Sept. 5, 1972

[54] RECEIVER ALARM SYSTEM

[72] Inventors: Ivan John Coussell; Roy Pattison, both of Cambridge, England

[73] Assignee: Pye Limited,

[22] Filed: Oct. 15, 1970

[21] Appl. No.: 81,009

[52] U.S. Cl. ..................325/302, 340/224, 340/415, 340/420

[51] Int. Cl. ..............................................H04b 1/06

[58] Field of Search ..............325/301–306, 366–368, 325/370–372, 398, 404, 405, 474; 340/415, 416, 420, 224

[56] References Cited

UNITED STATES PATENTS 2,806,944 9/1957 Sheffield et al. ...........325/302

*Primary Examiner*—Albert J. Mayer
*Attorney*—Frank R. Trifari

[57] ABSTRACT

A receiving system has two receivers, each including a squelch circuit arranged to give an output when the carrier level at demodulator of the receiver exceeds a threshold value. An alarm circuit has a first memory circuit settable by the simultaneous presence of squelch outputs from both receivers at any time during a transmission period, a second memory circuit settable by an output from the first memory circuit in the set condition, and a third memory circuit settable by the presence of a squelch output from either or both receivers during the transmission period. The setting signal is applied to the third memory circuit via a first delay means so arranged that the third memory circuit is not set unless the squelch signal persists for a period greater than the duration of transient interfering signals. The third memory circuit produces an output pulse when the setting signal is removed at the end of the transmission period. The output pulse is applied to a reset terminal of the second memory circuit, and to a reset terminal of the first memory circuit via a delay means adapted to provide a delay at least equal to the duration of the output pulse. The output pulse generated at the end of a transmission period is ineffective to reset the second memory circuit if the first memory circuit has been set during that transmission period, but is effective if the first memory circuit has not been set.

1 Claim, 2 Drawing Figures

Figure 1:
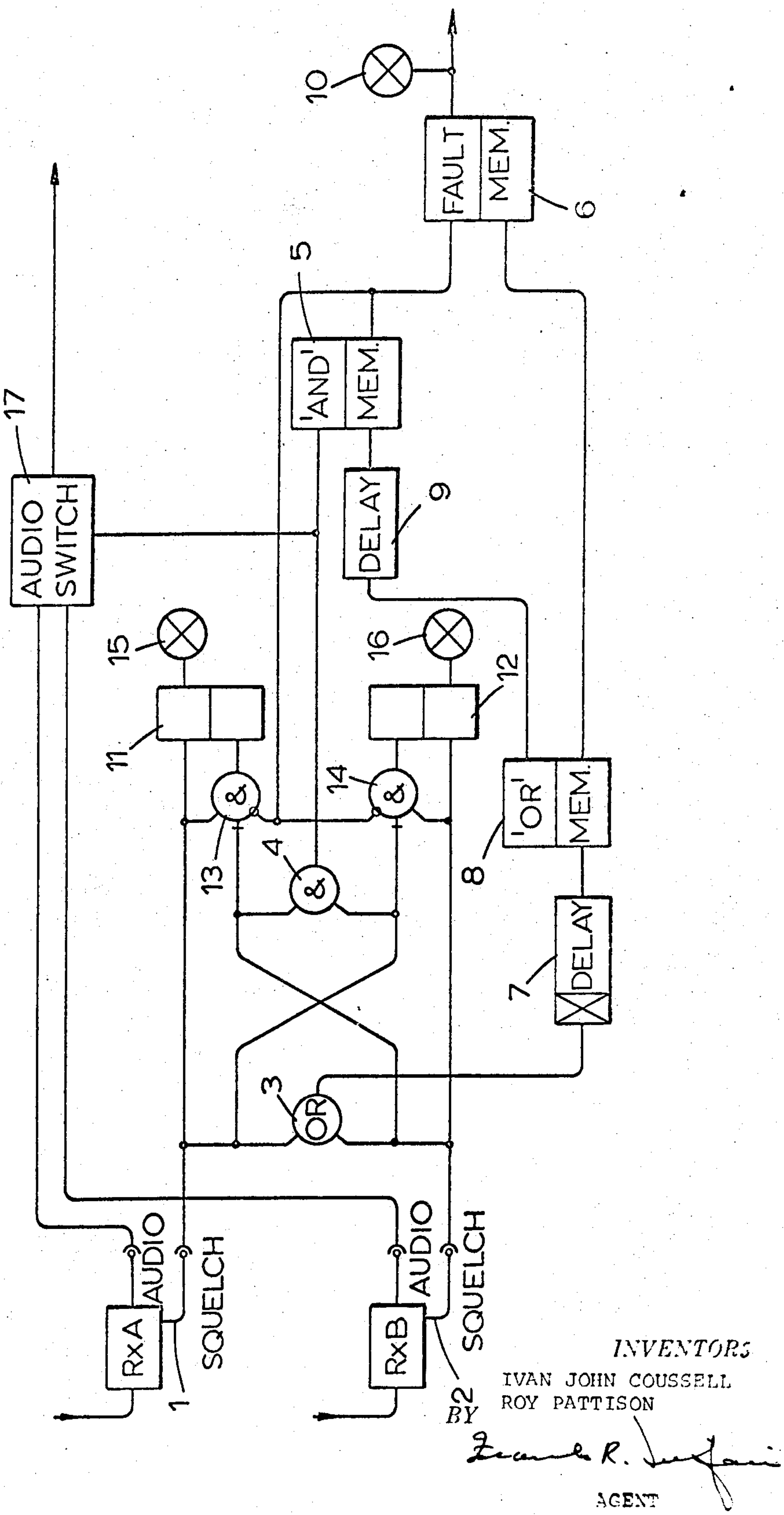

INVENTORS
IVAN JOHN COUSSELL
ROY PATTISON

BY [signature]
AGENT

*INVENTORS*
IVAN JOHN COUSSELL
ROY PATTISON
*BY* Frank R. Trifari
AGENT

RECEIVER ALARM SYSTEM

The present invention relates to means for providing warning of the failure of a receiver in installations in which two receivers are connected in parallel.

In communications systems of which a high order of reliability is required, it is common practice to guard against receiver failure or malfunction by providing two receivers having their audio outputs connected in parallel, so that in the event of failure of either receiver the other will continue to provide an output.

It is desirable that means be provided to give warning of the failure of either receiver.

When the radio frequency signal comprises a continuous carrier, provision of an alarm circuit is relatively simple. In each receiver a signal dependent on the presence of a carrier is obtained from a suitable point such as the demodulator, and is compared with a reference or threshold level. If the receiver is functioning correctly, the level of the signal will exceed the threshold, whereas if the receiver has failed or its gain been significantly reduce, the signal will fall below the threshold level.

The comparator is arranged to give an output at one or other of two discrete levels, a first level when the signal is above the threshold, and a second level when the signal is below the threshold.

It will be apparent that the squelch circuit commonly provided in communications receivers may be employed for this purpose. For simplicity, the comparator circuits will hereinafter be referred to as squelch circuits, but it is to be understood that the comparators and their associated circuits may be provided especially for the purpose of generating an alarm signal and need not necessarily provide squelch facilities.

With a continuous carrier, the squelch outputs of both receivers will normally be at the first level. If either receiver should fail its squelch output will change to the second level. An alarm circuit may be arranged to be energized if either or both squelch outputs is at the second level.

With intermittent carrier operation, the carrier ceases at the end of each transmission period. Consequently both squelch outputs change to the second level. With the simple arrangement outlined above, an alarm would be given at the end of each transmission.

It might be thought that the two squelch outputs would change simultaneously to the first level and revert to the second level at the beginning and end of each transmission. An alarm system could then be provided by comparing the two squelch outputs and giving an alarm if at any time they were in different states.

Such an arrangement is found to give a high proportion of false alarms. The threshold settings and response times of the two squelch circuits will rarely be equal. Similarly the receiver gains will not be identical. Consequently, variations in received signal strength, especially in mobile equipment, may result in the carrier falling momentarily below the threshold level in one receiver but not in the other. The arrangement is also very susceptible to interference from transient signals caused for example by thunderstorms.

To minimize the proportion of false alarms it is proposed to compare the squelch outputs of the two receivers during each transmission period and to give an alarm if and only if the squelch output of one or other receiver remains in the second state during the whole of two consecutive transmission periods. Means are also provided to minimize the effect of transient signals.

According to the invention, in a receiving system wherein two receivers are provided for the reception of an RF signal, each receiver including a squelch circuit arranged to give an output when the carrier level at demodulator of the receiver exceeds a threshold value, there is provided an alarm circuit comprising a first memory circuit settable by the simultaneous presence of squelch outputs from both receivers at any time during a transmission period, a second memory circuit settable by an output from the first memory circuit in the set condition, a third memory circuit settable by the presence of a squelch output from either or both receivers during the transmission period, the setting signal being applied to the third memory circuit via first delay means so arranged that the third memory circuit is not set unless the squelch signal persists for a period greater than the duration of transient interfering signals, the third memory circuit being adapted to produce an output pulse when the setting signal is removed at the end of the transmission period, said output pulse being applied to a reset terminal of the second memory circuit, and being also applied to a reset terminal of the first memory circuit and a second delay means adapted to provide a delay at least equal to the duration of the said output pulse, the arrangement being such that the output pulse generated by the third memory circuit at the end of a transmission period is ineffective to reset the second memory circuit if the first memory circuit has been set during that transmission period but is effective if the first memory circuit has not been set. An output from the second memory circuit is employed to energize alarm devices when the second memory circuit is in the reset condition.

In order to provide means for identifying which of the two receivers has failed when an alarm occurs, the invention may further comprise a fourth memory circuit settable by the squelch output of the first receiver which when set gives indication that the first receiver is operational, and a fifth memory circuit settable by the squelch output of the second receiver which when set gives indication that the second receiver is operational. The fourth and fifth alarm circuits if set during a transmission period, remain set when the corresponding squelch output is removed, unless, at the commencement of a subsequent transmission period, the squelch output from the corresponding receiver does not appear while that from the other receiver does appear.

In order that the above and other features of the invention may be more clearly understood, an embodiment will be described, by way of example, with reference to the attached drawings, of which:

FIG. 1 is a logic block diagram, and

Figure 2:
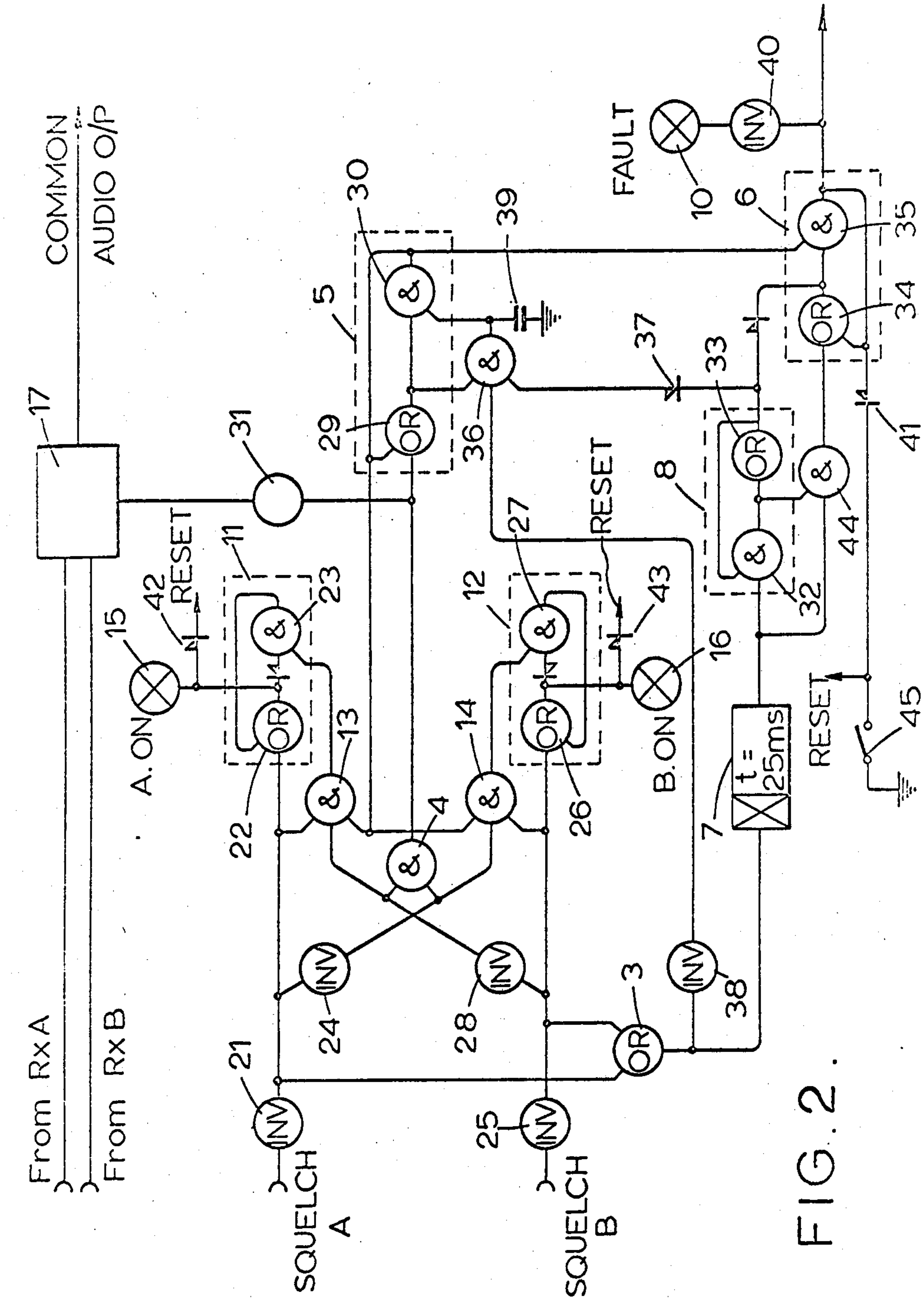

FIG. 2 a more detailed diagram of an alarm circuit according to the invention.

Referring to FIG. 1, the squelch outputs 1 and 2 of receivers R×A and R×B are connected to the inputs of an OR gate 3 and to the inputs of an AND gate 4. The output of gate 4 is connected to the SET input of a memory unit 5, referred to as the ( A and B) memory. An output of memory 5 is connected to the SET input of a memory unit 6, the Fault memory.

The output of gate 3 is connected via a delay unit 7 to an input of memory unit 8, the ( A or B) memory. Outputs of memory 8 are connected to a RESET input of memory 6, and via a delay unit 9 to a RESET input of memory 5.

The method of operation may be understood by considering first the situation with both of receivers A and B servicable.

When the signal is received, the squelch outputs 1 and 2 will both provide inputs to gates 3 and 4. Gate 4 will therefore give an output which will set memory 5 to the "A and B ON" condition. The output of memory 5 will then set memory 6 to the "no fault" condition.

The output from gate 4 will set memory 8 to the "A or B on" condition. At the end of the transmission the output from gates 3 and 4 will cease. Memory 5 is arranged to remain as set until it receives a reset pulse at its second input. Memory 8, however, is arranged to revert to the "A or B off" state and to produce a short pulse at its output when its input signal is removed.

This output pulse is applied directly to the reset input of memory 6, but produces no effect because memory 6 is held in the set condition by the output from memory 5, which is still set to the "A and B ON" condition.

The output pulse from memory 8 is also connected via delay unit 9 to the reset input of memory 5. The delay produced by unit 9 is such that the reset signal is not applied to memory 5 until the similar signal applied to memory 6 has decayed. Memory 5 is reset to the "A and B off" condition in readiness for the next transmission, and the holding input is removed from memory 6. The latter, however, remains as set in the "no fault" condition.

Suppose now that during a transmission the squelch output of one receiver, say R×A, disappears. This may be due either to failure of R×A, or to a small signal falling temporarily below the squelch threshold of R×A. Since at some time during the transmission both squelch outputs are present together, gate 4 gives an output, memory 5 is set to the "A and B on" condition, and memory 6 receives a holding input. Gate 3 gives an output throughout the transmission.

At the end of the transmission, memory 8 produces a reset pulse, which, as before, is ineffective to reset memory 6 because of the holding signal from memory 5. The delayed reset pulse then resets memory 5 to the "A and B off" condition. No fault indication is given at this stage.

If the disappearance of the squelch output of R×A were in fact due to the failure of R×A, the said output will be absent during the next transmission period. AND gate 4 will therefore give no output during this transmission. Memory 5 will remain in the "A and B off" condition and will not provide a holding input for memory 6. Gate 3 will provide an "A or B on" signal consequent on its receiving an input from the squelch circuit of R×B, and memory 8 will be set to the "A or B on" condition. At the end of the transmission, memory 8 will revert to the "off" condition and will produce a reset pulse which will now be effective to reset memory 6 to the "fault" condition. An output signal from memory 6 is employed to light a fault warning lamp 10 and to energize an external alarm circuit.

During subsequent transmissions, memory 5 will remain in the "A and B off" condition until the failed receiver is restored to operating condition so that gate 4 again receives inputs from the squelch circuits of both receivers.

It will be seen that no alarm is given if the squelch circuits of both receivers produce an output at any time during a transmission period, but that an alarm is given at the end of a transmission period if either one of the receivers produces no squelch output during the whole of that transmission period.

To reduce the susceptibility of the circuit to transient signals, unit 7 is connected between the output of gate 3 and the input of memory 8. Unit 7 is a delay unit so arranged that a step function applied to its input produces a step function at its output after a delay time *t*, but no output is produced if the input reverts to its original value before the end of delay time *t*. Therefore a squelch output from either R×A or R×B must persist for a time greater than *t* before OR memory 8 is set. Conveniently *t* is made of the order of 25 milliseconds which is sufficient to immunize the circuit from transient signals caused for example by lighting. Delay unit 7 may for example comprise a resettable monostable circuit.

To indicate the conditions of the individual receivers, further memory circuits 11 and 12 may be provided., Memory circuit 11 has its set input connected to squelch signal 1 from T×A and its reset input connected to the output of an AND gate 13. Similarly memory 12 has its set input connected to squelch output 2 from R×B and its reset input connected to the output of an AND gate 14. With both R×A and R×B operational, at the commencement of a transmission period squelch outputs 1 and 2 set memories 11 and 12 to the "A on" and "B on" conditions respectively. "A on" lamp 15 is lit by the output of memory 11 and "B on" lamp 16 is lit by the output of memory 12.

The inputs to gate 13 are squelch signal 1 from R×A, the inverse of squelch signal 2 from R×B and a signal from memory 5 which is effective to inhibit gate 13 from giving an output when memory 5 is in the "A and B ON" condition. Similarly, the inputs to gate 14 are the squelch signal 2, the inverse of squelch signal 1 and the inhibiting signal from memory 5.

Suppose R×A fails during a transmission. Squelch signal 1 is removed but memory 11 is not reset since gate 13 is inhibited by the signal from memory 5. After the end of the transmission, memory 5 is reset by the delayed reset pulse from memory 8, and this removes the inhibit signal from gate 13. But by this time, squelch 2 input is being applied to gate 13. Memory 11 therefore remains set to the "A on" condition.

At the start of the next transmission period, if R×A is faulty, no squelch 1 signal is received. The inverse squelch 2 signal is removed, and since memory 5 is not set to the "A and B on" condition, no inhibit signal is received at gate 13. All three inputs to gate 13 are therefore in the same state, and the gate gives an output which resets memory 13 to the "A off" condition, and lamp 15 is extinguished.

It will be apparent that the operation of memory 12 and lamp 16 is similar to the operation of memory 11 and lamp 15.

With both receivers operational lamps 15 and 16 are lit. The corresponding lamp remains lit if a squelch output is given by either receiver at any time during a transmission period. If either receiver fails during a transmission period and remains faulty, the corresponding lamp is extinguished at the commencement of the next transmission period.

If the audio signals of the two receivers were simply connected in parallel, changes in level of the final audio output would occur dependent upon whether one or both receivers were contributing to the output.

To provide a constant output level, the audio signals from R×A and R×B are fed to separate inputs of an audio switch unit 17. Unit 17 comprises a combining network, an attenuator in the path of the combined signal and an electronic switch connected so that in one condition it short-circuits the attenuator. The electronic switch is driven by the output from gate 4 in such a manner that it inserts attenuation when both receivers are operative and removes the attenuation when only one receiver is contributing to the output signal.

A particular embodiment of the invention will be described with reference to FIG. 2. In this embodiment a positive logic convention (i.e. +ve = logic 1) is observed. All gates employed are basically OR gates having inverted outputs. In certain instances they are employed as AND gates in that a logic 1 output is produced by all the inputs to the gate becoming logic 0. Single-input gates are employed as inverters.

Each memory circuit comprises a pair of gates, the output of the first gate being connected to an input of the second gate and the output of the second gate being connected to an input of the first gate, one gate of the pair being an AND gate and the other being an OR gate.

The receiver squelch circuits are arranged to give a logic 0 (−ve) output when the received signal exceeds the squelch threshold and to give a logic 1 output when the signal falls below the threshold.

Assuming in the first place that both receivers are serviceable, then during a transmission period both of the inputs 1 and 2 will be at logic 0. Gate 21 inverts input 1, the R×A squelch signal, to provide a logic 1 signal which sets the R×A memory 11 (gates 22 and 23) to the "on" condition and which is also applied to gates 3, 13 and 24. Similarly, gate 25 inverts the R×B squelch signal to provide a logic 1 signal which sets the R×B memory 12 (gates 26 and 27) and which is applied to gates 3, 14 and 28. Lamps 15 and 16, driven respectively by memories 11 and 12, are lit.

Gate 24 inverts its input signal to produce a logic 0 signal which is applied to gates 4 and 13, while gate 28 applies a logic 0 signal to gates 4 and 14.

Since gate 4 receives two logic 0 inputs, its output becomes logic 1, which sets the (A and B) memory 5 (gates 29 and 30) to the "on" condition. The logic 1 output from gate 4 is also fed to gate 31, where it is inverted to provide a logic 0 input to audio switch 17, causing switch 17 to insert attenuation in the audio signal path.

Gate 3 produces a logic 0 output which is applied to delay unit 7. After the delay time *t* (typically 25 ms) has elapsed, the output of unit 7 becomes logic 1, which sets (A or B) memory 8.

The logic 1 output from memory 5 sets Fault memory 6 (gates 34, 35) to the "no fault" condition in which it gives a logic 0 output.

Suppose now that a receiver, say R×A, fails during the transmission. The input to gate 21 becomes logic 1, and therefore the output of gate 21 becomes logic 0, and is applied to memory 11 and to gates 3, 13 and 24. This signal does not affect the output of gate 3, since the other input remains logic 1, and hence the output remains logic 0. Consequently the (A or B) memory 8 is not affected.

The logic 0 signal is ineffective at memory 11, since this memory can only be reset by a logic 1 signal at its other input (to gate 23), and it is also ineffective at gate 13 since this gate is receiving a logic 1 inhibiting signal from the output of memory 5.

Gate 24 inverts the logic 0 output of gate 21 to provide a logic 1 input to gate 4. The output of gate 4 therefore becomes logic 0, which is ineffective at memory 5, since this memory can be reset only by a logic 1 signal at its other input (to gate 30).

Since neither memory 5 nor memory 8 is reset, Fault memory 6 is not affected and no fault indication is given at this stage.

The logic 0 output of gate 4 is inverted by gate 31 and applied as a logic 1 signal to audio switch 17. Attenuation is removed from the audio signal path to maintain the audio level constant despite the loss of the contribution from R×A.

At the end of the transmission, the R×B squelch output becomes logic 1. Hence the output of gate 25 becomes logic 0, and that of gate 3 becomes logic 1. The output of delay unit 7, then becomes logic 0, which resets memory 8, resulting in a positive-going (logic 1) output pulse from gate 44. Note that this is a short duration pulse, since initially, when the output of unit 7 was logic 1 and memory 8 was set "on", gate 44 received a logic 1 input from unit 7 and a logic 0 input from gate 32. Its output was then logic 0. At the instant that the output of unit 7 changes to logic 0, but before memory 8 resets, gate 44 receives two logic 0 inputs and therefore gives a logic 1 output. When memory 8 has reset, the output of gate 32 becomes logic 1, and the output of gate 44 reverts to logic 0. The duration of the positive-going pulse from gate 44 is therefore determined by the resetting time of memory 8.

The logic 1 pulse from gate 44 is applied to memory 6, but is ineffective to reset this memory which is held in the "no fault" condition by the logic 1 signal from memory 5 still applied to its second input (to gate 35). The output of memory 6 remains at logic 0.

With memory 8 reset, the inhibiting input to gate 36 via diode 37 is removed, allowing the output of gate 3, inverted by gate 38 to set the output of gate 36 to logic 1. This resets memory 5 in readiness for the next transmission. A capacitor 39 connected to the output of gate 36 delays the resetting of memory 5 until after the termination of the resetting pulse applied by gate 44 to memory 11. Gate 36 and capacitor 39 are together equivalent to delay unit 9 of FIG. 1.

At the commencement of the next transmission, assuming R×A still faulty, input 1 will be logic 1 while input 2 will become logic 0. Gate 21 will apply a logic 0 signal to gates 3, 13 and 24 and to memory 11 while gate 25 will apply a logic 1 signal to gates 3, 14 and 28.

The output of gate 28 will be logic 0, and gate 13 will therefore receive logic 0 signals on all three inputs, since the signal from memory 5 became logic 0 when it was reset after the end of the previous transmission. The output of gate 13 becomes logic 1 which resets memory 11 to the "R×A off" condition and lamp 15 is extinguished.

Gate 24 will provide a logic 1 input to gate 14, holding its output at logic 0. Memory 12 will not be reset and lamp 16 will remain lit.

Gate 3 will receive a logic 1 input from gate 25, and will give a logic 0 output which will set memory 8 via delay 7.

Gate 4 will receive a logic 1 input from gate 24 and a logic 0 input from, gate 28. The output of gate 4 will remain logic 0, memory 5 will not be set and audio switch 17 will continue to receive a logic 1 input.

At the end of the transmission, the input to gate 25 will become logic 1, giving a logic 0 input to gate 3, whose output will become logic 1. This will reset memory 8, producing a logic 1 pulse output from gate 44, which will now be effective to reset memory 6, since the signal applied to gate 35 from memory 5 is now logic 0.

The output from memory 6 will become logic 1 and after inversion in gate 40 will illuminate a fault warning lamp 10. The output of memory 6 may also be employed to energize an external alarm circuit.

To permit normal operation of the alarm system to be restored after a receiver fault has been restored, a reset switch 45 is provided which when closed applies a logic 0 signal via respective diodes 41, 42 and 43 to memories 6, 11 and 12 to clear fault indications stored in these memories.

Those skilled in the art will appreciate that embodiments may be constructed to perform the logical operations described with reference to FIG. 1, but employing a logic convention and types of gate circuit other than used in the particular embodiment described with reference to FIG. 2.

Other variations are possible within the scope of the invention. In the arrangement described, there remains some small possibility of a false alarm arising when a small signal is being received, if the sensitivities and threshold levels of the two receivers are different. This possibility may be further reduced by providing, in each receiver, two squelch circuits, the first having its threshold set at the normal level, i.e., somewhat above the noise level of the receiver in the no signal condition, and the second having its threshold set at a higher level.

The outputs of the two more sensitive squelch circuits will be fed to an AND gate corresponding to gate 4 of FIG. 1 while the outputs of the two less sensitive circuits will be fed to an additional OR gate whose output will be applied to delay unit 7 instead of the output of gate 3 of FIG. 1.

An alarm can only be given if the OR memory 8 has first been set, and to set memory 8 the signal received by at least one of the receivers must reach the threshold of the second squelch circuit of that receiver. By suitable adjustment of the first and second thresholds it can be arranged that a signal which reaches the second threshold of the more sensitive receiver also reaches the first threshold of the less sensitive receiver. Therefore a signal which produces a second squelch output from either receiver will produce a first squelch output from both receivers, setting AND memory 5 and avoiding any possibility of false alarms.

What is claimed is:

1. A receiving system comprising two receivers for the reception of an RF signal, each receiver including a squelch circuit arranged to give an output when the carrier level at the demodulator of the receiver exceeds a threshold value, an alarm circuit comprising a first memory circuit settable by the simultaneous presence of squelch outputs from both receivers at any time during a transmission period, a second memory circuit settable by an output from the first memory circuit in the set condition, a third memory circuit settable by the presence of a squelch output from either or both receivers during the transmission period, the setting signal being applied to the third memory circuit via first delay means so arranged that the third memory circuit is not set unless the squelch signal persists for a period greater than the duration of transient interfering signal, the third memory circuit being adapted to produce an output pulse when the setting signal is removed at the end of the transmission period, said output pulse being applied to a reset terminal of the second memory circuit, and being also applied to a reset terminal of the first memory circuit via second delay means adapted to provide a delay at least equal to the duration of the said output pulse, whereby the output pulse generated by the third memory circuit at the end of a transmission period is ineffective to reset the second memory circuit if the first memory circuit has been set during that transmission period but is effective if the first memory circuit has not been set.

* * * * *